United States Patent [19]
Kuzarov

[11] Patent Number: 5,303,477
[45] Date of Patent: Apr. 19, 1994

[54] MULTI-RING SPROCKET

[75] Inventor: Encho Kuzarov, Milwaukie, Oreg.

[73] Assignee: Blount, Inc., Montgomery, Ala.

[21] Appl. No.: 974,147

[22] Filed: Nov. 10, 1992

[51] Int. Cl.$^5$ .............................................. B23D 57/02
[52] U.S. Cl. ........................................ 30/384; 30/383; 30/381; 474/164
[58] Field of Search ................ 30/384, 383, 382, 381, 30/385; 83/830, 831, 832, 833; 125/21; 474/152, 164

[56] References Cited

U.S. PATENT DOCUMENTS

| 1,181,175 | 5/1916 | Shapiro. | |
|---|---|---|---|
| 3,045,502 | 7/1962 | Carlton | 30/381 |
| 3,135,127 | 6/1964 | Reed | 474/152 |
| 3,163,052 | 12/1964 | Orhili et al. | 474/164 |
| 3,416,385 | 12/1968 | Schenk. | |
| 3,491,806 | 1/1970 | Kaisser et al. | |
| 3,602,274 | 8/1971 | Barrett | 30/384 |
| 3,650,158 | 3/1972 | Van Huis. | |
| 4,414,876 | 11/1983 | Loigerot. | |
| 4,876,796 | 10/1989 | Calkins et al. | 30/383 |
| 5,098,348 | 3/1992 | O'Neel | 30/381 |
| 5,136,783 | 8/1992 | Bell et al. | 125/21 |

Primary Examiner—Richard K. Seidel
Assistant Examiner—Hwei-Siu Payer
Attorney, Agent, or Firm—Klarquist, Sparkman, Campbell, Leigh & Whinston

[57] ABSTRACT

A sprocket for a chain including a thick hub portion and a plurality of thinner sprocket rings mounted on the hub. The hub has a rounded polygon peripheral configuration and the rings have complementary bores to receive the hub. The rings have sprocket teeth defined about their outer edges. When the sprocket rings are mounted in face-to-face nesting arrangement on the hub the teeth on adjacent sprocket rings are aligned axially of the hub. A pair of side plates having a greater diameter than the sprocket rings confine the rings on the hub and aid in holding a chain thereon during operation.

17 Claims, 4 Drawing Sheets

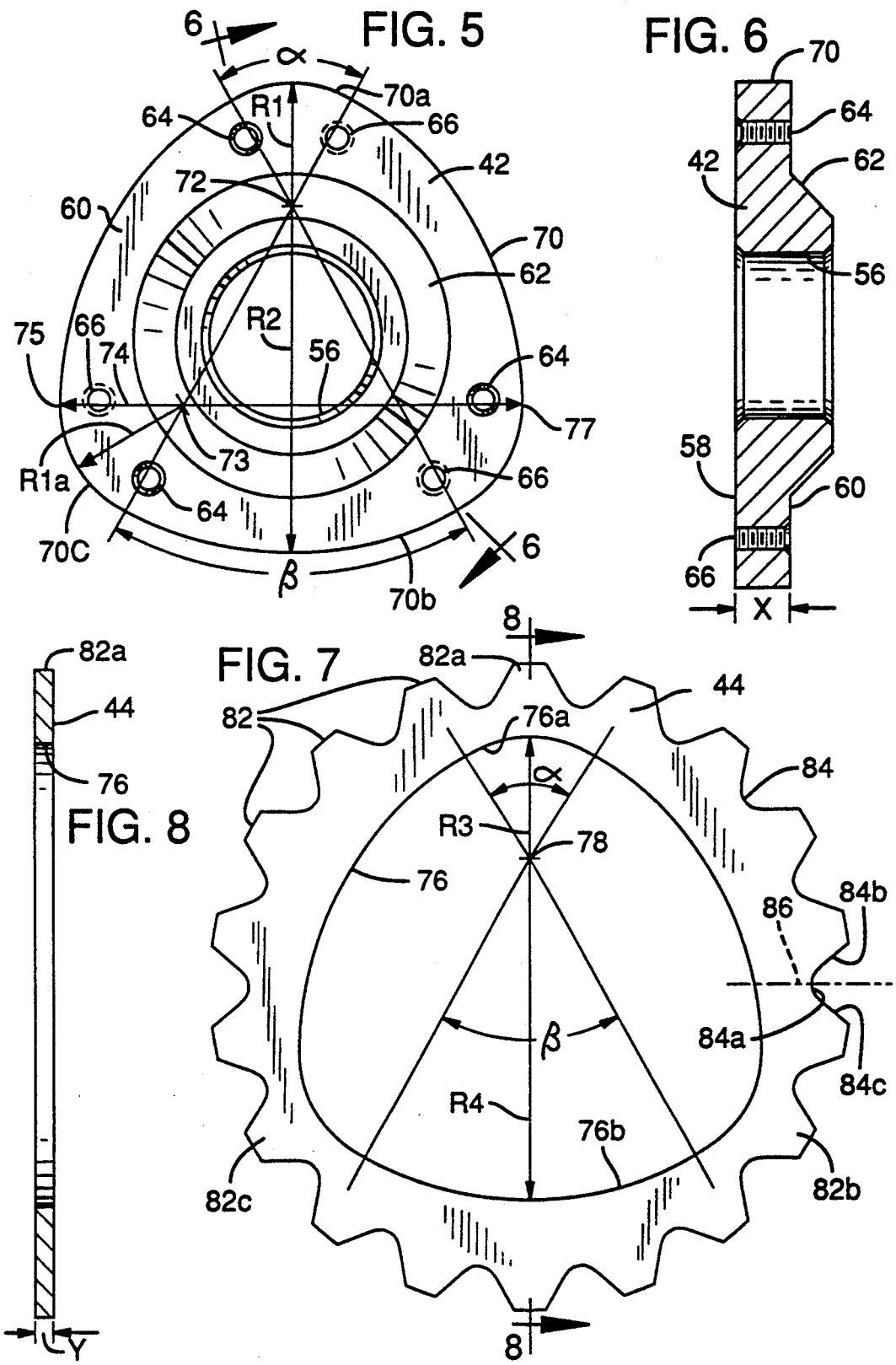

MULTI-RING SPROCKET

The present invention relates to a sprocket, and more particularly to a sprocket for use in driving chain.

Sprockets used in driving heavy chain often must be machined from a rather thick piece of metal to define appropriate chain engaging teeth and pockets. An example of such is found in the need for sprockets which drive large pitch cutting chain used in cutting stone and aggregate materials.

In many situations the sprocket is subjected to substantial wear and abuse which requires that it be changed frequently. This is expensive and often requires special tools to remove the sprocket from its associated drive shaft.

BRIEF DESCRIPTION OF THE INVENTION

Accordingly, it is an object of the present invention to provide a sprocket which is economical to manufacture and has operating components that are easily replaced.

More specifically, an object of the invention is to provide a sprocket which has a hub on which are mounted multiple sprocket rings having teeth at their peripheral edges, which rings are economical to manufacture and may be easily replaced.

Yet another object of the invention is to provide such a sprocket in which the hub has a noncircular outer configuration and the sprocket rings have apertures complementary to the outer configuration of the hub so that they may be slipped onto and off the hub for initial set-up and subsequent replacement.

Yet another object of the invention is to provide such a sprocket in which the noncircular hub has a substantially rounded polygonal configuration which serves to transmit rotational force to the sprocket ring and provides a reasonable distribution of stress loads in the rings and hub during operation.

Another object of the invention is to provide such a sprocket in which the configuration of the hub and the apertures in the rings are such that when external forces are imposed on the rings during operation the rings are self-centering, in that they maintain concentricity with the center of rotation of the hub.

A still further object is the provision of such a sprocket which also includes side plates mounted on the hub at opposite sides of the sprocket rings to detachably secure the rings on the hub and which extend radially outwardly beyond the periphery of the rings to provide a chain retaining rim about the outer edges of the hub.

Yet another object is to provide such a sprocket in which the sprocket rings nest in face-to-face relationship with each other and the teeth on each ring are aligned with the teeth on contiguous rings to provide alternating chain receiving teeth and pockets.

Yet another object is to provide such a sprocket in which the hub and rings are so configured that the rings may be placed on the hub in substantially any orientation and still have the teeth on one ring aligned with the teeth on a contiguous ring when mounted on the hub.

BRIEF DESCRIPTION OF THE DRAWINGS

FIG. 5 is a side elevation view of a hub removed from the sprocket;

FIG. 6 is a cross-sectional view taken along line 6—6 in FIG. 5;

FIG. 7 is a side elevation view of a sprocket ring removed from the sprocket; and FIG. 8 is a cross-sectional view taken along line 8—8 in FIG. 7.

DETAILED DESCRIPTION OF A PREFERRED EMBODIMENT

Figure 1:
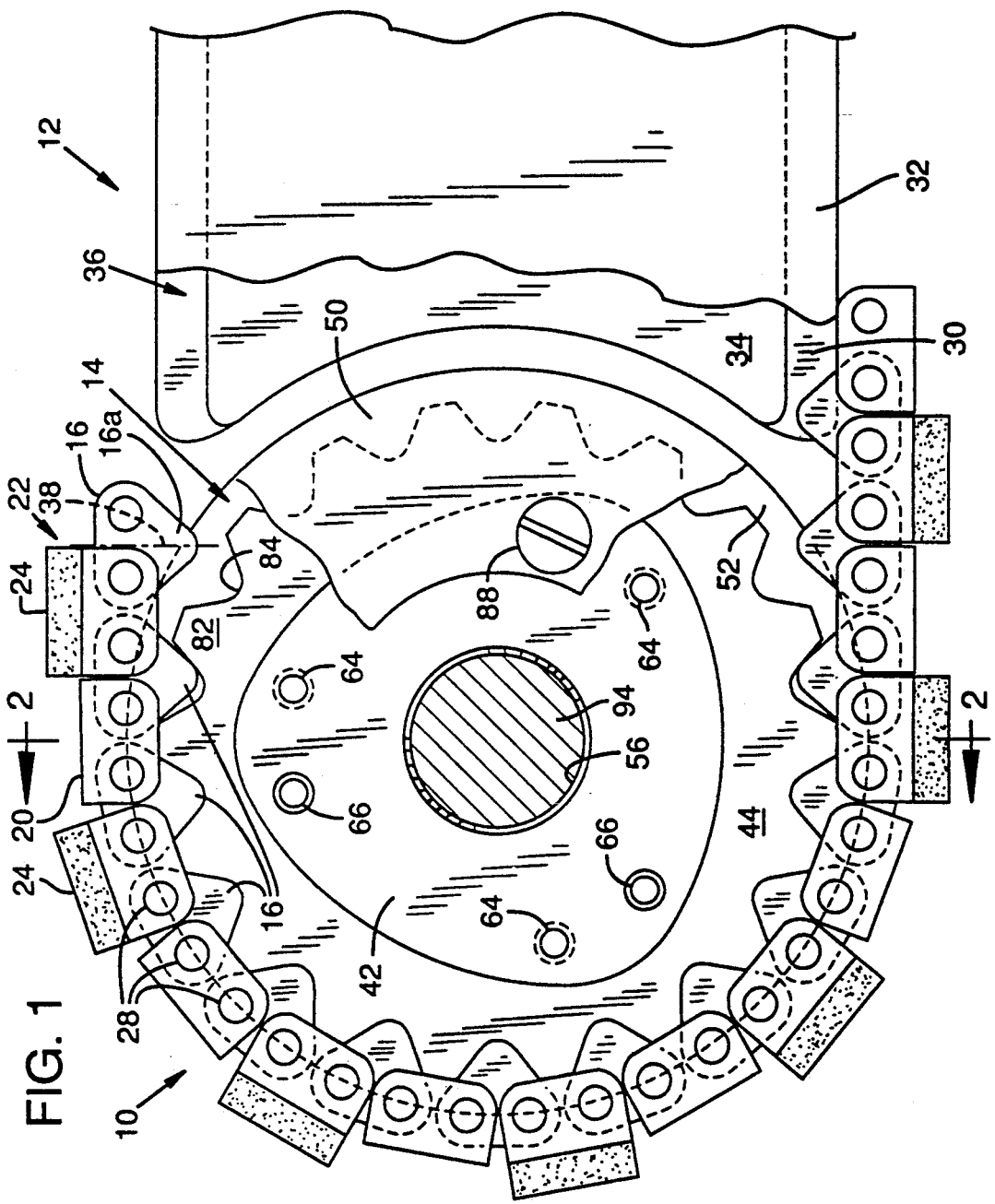
FIG. 1 is a side elevation view of an embodiment of the sprocket of the invention shown in an operating environment with a chain saw bar and aggregate cutting chain, with portions of the bar and sprocket broken away.

Referring to the drawings, and first more specifically to FIG. 1, at 10 is indicated generally a section of an aggregate cutting saw chain, the rear end of a chain saw guide bar 12 about which the chain runs in its cutting operation, and a drive sprocket 14 constructed according to an embodiment of the invention. These parts would all be mounted on a powered operating head having a drive shaft for rotating sprocket 14. The chain would be a continuous loop extending fully about the guide bar.

Figure 2:
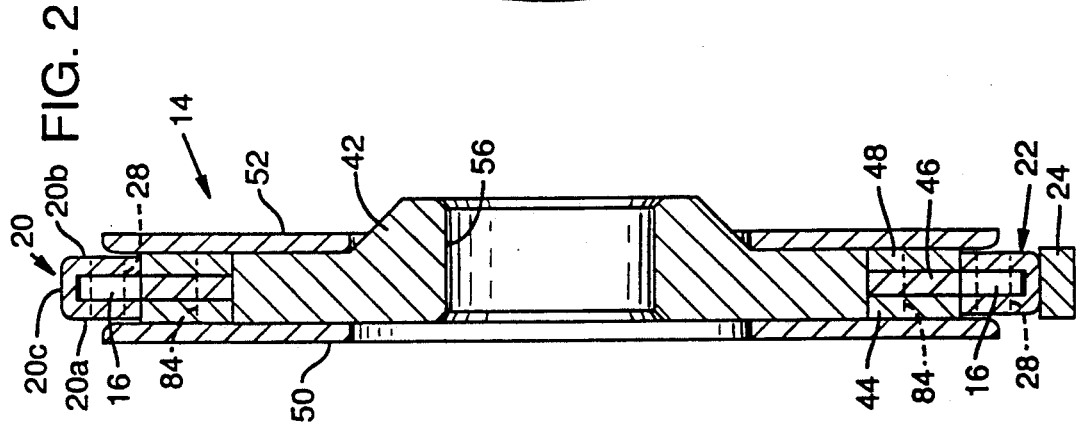
FIG. 2 is an enlarged cross-sectional view taken generally along line 2—2 in FIG. 1.

The chain 10 is composed of a plurality of pivotally interconnected links. These include center drive links 16 having depending tangs 16a. Interposed between successive center links 16 are connector links 20 and cutting links 22. The connector links, as is best seen in FIG. 2, have a pair of upright side plate portions 20a, 20b and an interconnecting top portion 20c. An end portion of a center link 16 is captured between side plates 20a, 20b. Note that the tang portions 16a of the center links are symmetrical about a vertical center line 38 bisecting a line connecting the forward and rearward rivet holes in a center link. The tang portion has a substantially rounded lower edge margin, with forward and rearward edge margins extending upwardly and away from centerline 38 at substantially equal angles.

Cutter links 22 are similar in construction to connecting links 20, with the exception that they have secured to their upper surfaces a block of diamond impregnated cutting material 24. Rivets 28 extend through aligned bores in the center links and cutter and connector links to pivotally interconnect the components in the chain.

The cutter bar 12 is of a substantially standard configuration having a pair of outer side laminates 30, 32 between which are sandwiched and secured a center, or inner laminate 34. The outer laminates are wider than the inner laminate, thus to provide a groove 36 within which the depending tangs 16a of the center links may ride. The undersides of the side plate portions 20a, 20b of the connector and cutter links ride atop the rail portions of side plates 30, 32 in operation.

Figure 3:
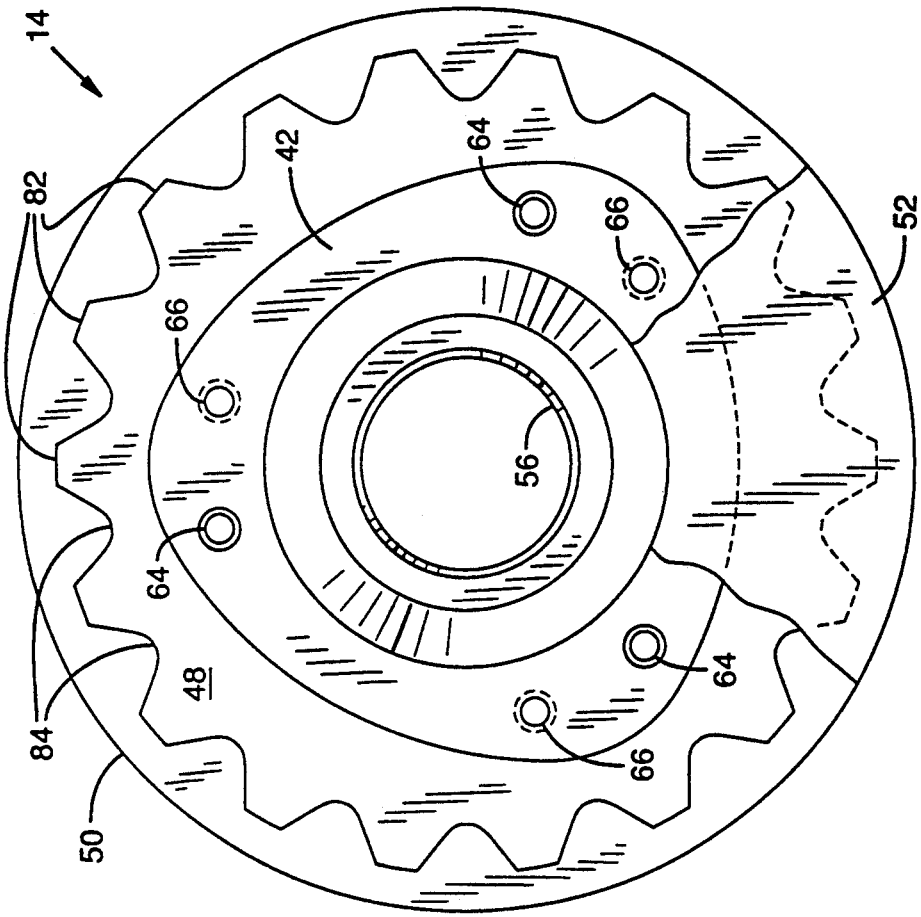
FIG. 3 is a side elevation view of the sprocket shown in FIG. 2.
Figure 4:
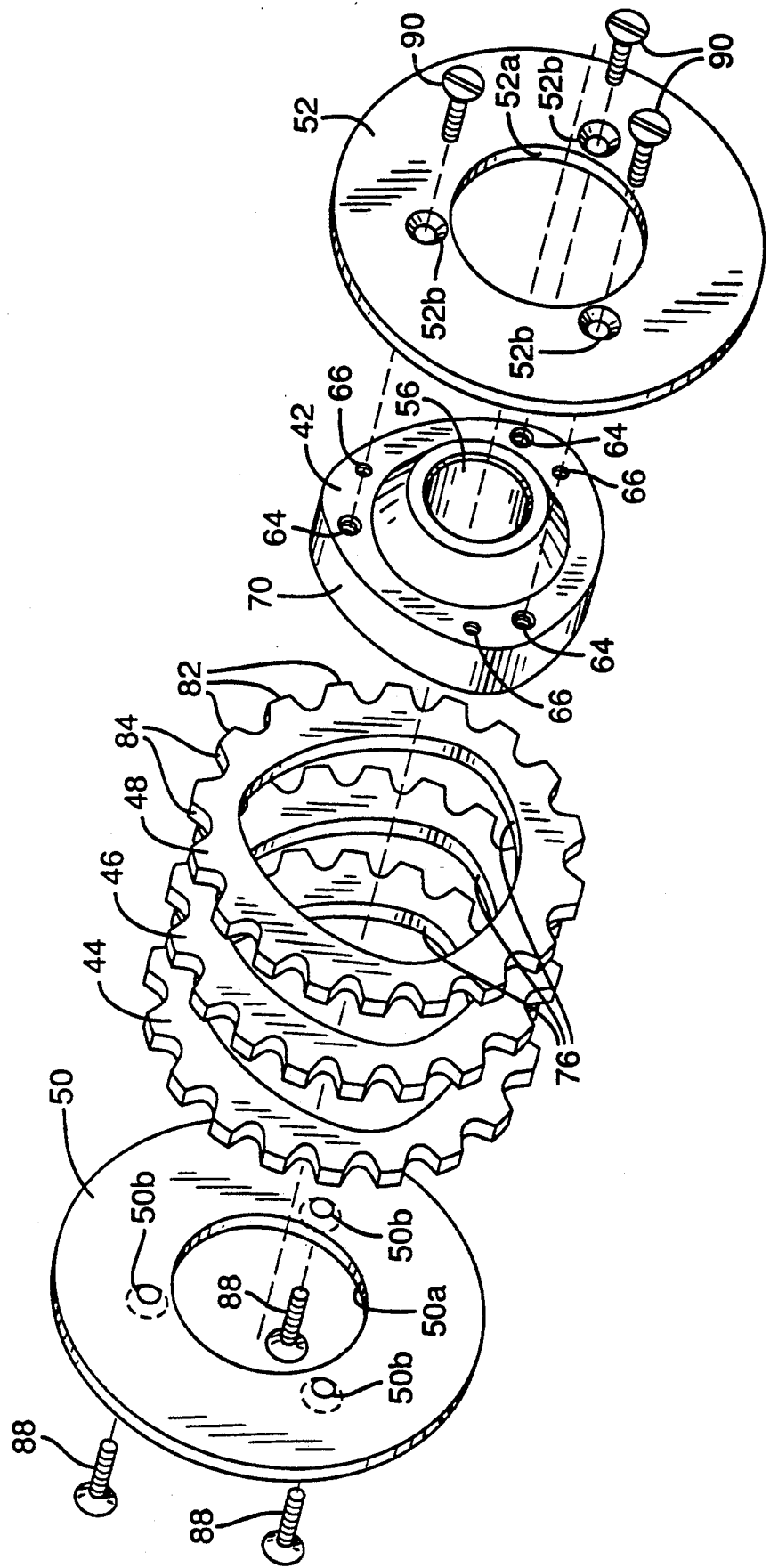
FIG. 4 is an exploded view of the sprocket illustrating its component parts.

Describing sprocket 14 in greater detail, and referring specifically to FIG. 4, it includes several component parts. These include a hub 42, a plurality (here three), of sprocket rings 44, 46, 48, and a pair of circular side plates 50, 52. In FIG. 1, a majority of side plate 50 has been broken away to better illustrate the sprocket structure and its engagement with cutting chain 10. In FIG. 3, a majority of side plate 52 similarly has been broken away to illustrate remainder structure of the sprocket.

Referring to FIG. 2, in assembled configuration side plate 52 is secured to one face surface of hub 42, sprocket rings 44, 46, 48 are received on the peripheral surface of hub 42 and fit in close face-to-face contact, and the opposite side plate 50 is secured against the opposite face of 42 to form an operating sprocket as illustrated in FIGS. 1-3.

Describing hub 42 in greater detail, and referring specifically to FIGS. 5 and 6, the hub is a rather thick machined metal part having a central bore 56 extending axially therethrough and a pair of opposite side faces 58, 60. The hub has a frustoconical portion 62 projecting outwardly from side face 60. A plurality of internally threaded bores 64, 66 extend through hub 42. The peripheral thickness "x" of the illustrated embodiment is about 0.375 inch.

As is best seen in FIG. 5, the peripheral surface 70 of the hub is formed in what is referred to herein as a rounded, polygonal shape, more particularly herein a rounded triangular shape. The periphery is formed of a plurality of alternating short-radius and long-radius arcs. Each short-radius arc is diametrically opposed to a long-radius arc and shares a common center of curvature.

Explaining further, a short-radius arc section 70a has a radius denoted R1 about a center of curvature 72. This portion of the periphery extends through an angle α of approximately sixty (60) degrees. In the illustrated embodiment R1 is about 0.75 inch.

Diametrically opposite from section 70a is a long arc section 70b having a radius R2 with a center of curvature at 72, also. This peripheral section 70b also extends through an arc β of approximately sixty (60) degrees. In the illustrated embodiment R2 is about 2.0 inches.

The structure described provides a rounded polygonal, or triangular, configuration in which side-to-side dimensions measured across any center of curvature for an arc on the hub are equal to the sums of R1 plus R2. This makes it simple to check for accuracy of manufacturer by using an outside caliper set at the sum of R1 plus R2.

Explaining further, by placing one leg of the caliper against an outside surface of one side of the hub and swinging it past the opposite side of the hub it should find an opposite point at a distance equal to R1 plus R2. For example, a center of curvature 73 is noted for arc 70C with a radius between 73, 70C denoted at R1a. A line 74 having a length equal to R1 plus R2 denotes the proper setting for an outside measuring caliper. The outside caliper set with one leg to touch point 75 will extend across center of curvature 73 to point 77 at the opposite side of the hub.

Referring now to FIGS. 7 and 8, a sprocket ring 44 is illustrated which is made from a thin metal plate having a thickness of "y" of about 0.125 inch. The ring has a central aperture 76 having a configuration complementary to the outer periphery 70 of hub 42. Explaining further, aperture 76 has alternating short-radius and long-radius arcs. One opposed pair of such arcs 76a, 76b is indicated having a center of curvature at 78 with the short-radius arc 76a having a radius of curvature R3 which is similar to or only slightly greater than R1 of the hub and a long-radius arc length R4 which is similar to or only slightly greater than the radius of curvature R2 for section 70b of the hub. These extend over arcs α and β of approximately sixty (60) degrees as in hub 42.

Arrayed about the periphery of the sprocket ring are sprocket teeth 82 which are in the plane of and project radially outwardly from remainder portions of the ring forming gullets 84 therebetween. Each gullet 84 is symmetric about a centerline 86 extending radially outwardly from the center of the sprocket. Each gullet has a rounded bottom portion 84a and opposed side margins 84b, 84c which extend upwardly and away from centerline 86 at substantially equal angles. This gullet configuration is complementary to and adapted to closely receive depending tangs 16a on the center links of the cutter chain.

It will be seen that the sprocket teeth 82 are evenly spaced about the periphery of the sprocket ring whereby teeth 82a, 82b, 82c are each directly adjacent a short radius arc section.

The configuration of the sprocket rings allows them to be mounted on the hub 42 in close fitting relationship as illustrated in FIGS. 2 and 3. The sprocket rings nest in close face-to-face relationship with the teeth 82 on adjacent sprocket rings 44, 46, 48 aligned axially of the hub to define alternating radially-extending chain driving sprocket teeth and tang receiving gullets for driving chain 10.

It will be readily apparent from the drawings that when the rings are nested in face-to-face relationship on the hub they define a chain-receiving sprocket width at their outer peripheral portion which is substantially equal to the combined thicknesses of the nested rings. Further, the contiguous teeth on the rings form alternating chain-receiving radially extending teeth and pockets which extend fully across this chain-receiving width.

With the configuration of hub and sprocket rings illustrated, the sprocket rings may be placed on the hub in any orientation in which they will fit for mounting, either in the positions illustrated or reversed, and the teeth thereon will continue to align axially of the sprocket to provide combined teeth and gullets for driving the chain. Further, the rounded polygonal shape of the hub serves to provide a positive driving connection between the hub and the sprocket rings and provides a good distribution of stress throughout the parts.

Each of side plates 50, 52 is circular in configuration and has a diameter somewhat greater than the outer diameter of the sprocket rings so that the peripheral edges of the side plates extend outwardly beyond the sprocket rings as shown in FIGS. 2 and 3. This aids in holding the chain on the sprocket during operation. Each of the side plates 50, 52 has a circular bore 50a, 52a, respectively, extending therethrough. Each also has three smaller bores 50b, 52b, respectively, extending therethrough. Bore 52a in side plate 52 is configured to fit around frustoconical portion 62 of the hub.

With sprocket rings 44, 46, 48 mounted on hub 42 and with side plates 50, 52 resting against opposite faces of hub 42, screws 88 are inserted through bores 50b in side plate 50 and screwed into bores 66 in the hub to fasten side plate 50 thereon. Similarly, screws 90 are extended through bores 52b in side plate 52 and into threaded bores 64 to hold side plate 52 thereon.

The sprocket thus assembled may be mounted on a drive shaft 94 (FIG. 1) of the power head with which the sprocket is to be operated. Explaining further, and referring to FIG. 1, bore 56 of the hub is slipped onto drive shaft 94 and may be secured thereto either by appropriate keys or other securing means. The sprocket is aligned with guide bar 12 and chain 10 is mounted on the sprocket and bar. The depending tangs of the center links 16 rest in gullets 84 on the sprocket with teeth 82 therebetween ready to impart a driving force to the chain.

The sprocket described is economically manufactured by forming central hub 42 as a machined element. The hub is subjected to less abuse and wear than are the sprocket rings, and thus the hub can be used for a substantial amount of time.

The sprocket rings 44, 46, 48 and side plates 50, 52 which will experience more abuse and wear during operation, may be economically manufactured either by being stamped from sheet material or cut therefrom using a process such as a laser cutting. Initial assembly is simple, in that one side plate is secured to hub 42, sprocket rings 44, 46, 48 are slipped onto the hub in nesting relationship, and the opposite side plate is secured to the opposite side of the hub. Regardless of the orientation in which the sprocket rings are mounted on the hub, the teeth are arrayed thereabout in such a manner that the teeth on adjacent sprocket rings will continue to be aligned to properly receive and drive the chain.

Operational wear will eventually require that the sprocket rings (either one or more thereof) be reversed in direction to obtain additional use, or replaced entirely. Such is a simple matter in that it is necessary only to remove the screws holding one of the side plates thereon, slip the appropriate sprocket rings off hub 42, and either reverse them or replace them as needed.

While a preferred embodiment of the invention has been described herein, it should be apparent that variations and modifications are possible without departing from the spirit of the invention as set out in the following claims.

I claim:

1. A sprocket comprising
a hub having a preselected axial thickness and a non-circular configuration as viewed axially of the hub, and
multiple substantially planar sprocket rings mounted on said hub, each ring having a thickness less than said preselected axial thickness and an aperture defined therein complementary to and in close fitting arrangement on said hub, each of said rings having sprocket teeth formed at its peripheral edge in the plane of and projecting radially outwardly from remainder portions of the ring, with the sprocket teeth being so configured and arrayed about the periphery of each ring that when the rings are mounted on the hub the teeth on adjacent rings are aligned axially of the sprocket, said rings nesting in face-to-face contiguous relationship on said hub to define a chain-receiving sprocket width substantially equal to the combined thicknesses of said rings and the contiguous teeth on said rings forming alternating chain-receiving radially-extending teeth and pockets extending fully across said chain-receiving sprocket width.

2. The sprocket of claim 1, which further comprises means detachably securing said rings on said hub.

3. The sprocket of claim 1, wherein the non-circular configuration of said hub is a rounded polygonal configuration.

4. The sprocket of claim 3, wherein said rounded polygonal configuration is comprised of a plurality of arcs having spaced centers of curvature, and side-to-side measurements taken across the centers of curvature are substantially the same about the hub.

5. The sprocket of claim 3, wherein said rounded polygonal configuration is composed of a series of alternating short-radius and long-radius arcs.

6. The sprocket of claim 5, wherein a short-radius arc is diametrically opposed to a long radius arc and said opposed arcs have substantially the same center of curvature.

7. The sprocket of claim 1, wherein the non-circular configuration of said hub is a rounded triangular configuration.

8. The sprocket of claim 7, wherein said rounded triangular configuration is comprised of a plurality of arcs having spaced centers of curvature, and side-to-side measurements taken across the centers of curvature are substantially the same about the hub.

9. The sprocket of claim 1, wherein the teeth formed on the rings and the apertures as so configured and oriented on the rings that each ring may be mounted on the hub in a variety of positions relative to the hub and the teeth on adjacent rings will retain alignment.

10. The sprocket of claim 9, wherein the teeth on the rings and the apertures are so configured and oriented on the rings that they can be mounted on the hub in either first positions or reversed positions and teeth on adjacent rings will retain alignment.

11. A sprocket comprising
a hub having a preselected axial thickness and a non-circular configuration as viewed axially of the sprocket, and
multiple substantially planar sprocket rings mounted on said hub, each ring having a thickness less than said preselected axial thickness and an aperture extending therethrough complementary to and close fitting on said hub, each sprocket ring having sprocket teeth arrayed about its peripheral edge in the plane of and projecting radially outwardly from remainder portions of the ring which align with like teeth on an adjacent ring to form chain-receiving teeth and pockets, said rings nesting in face-to-face contiguous relationship on said hub to define a chain-receiving sprocket width substantially equal to the combined thicknesses of said rings and the contiguous teeth on said rings forming alternating chain-receiving radially-extending teeth and pockets extending fully across said chain-receiving sprocket width.

12. In a chain saw having a guide bar carrying a saw chain, the saw chain including drive tangs movable along a guide bar and a drive sprocket, said sprocket comprising
a hub of a preselected axial thickness and a non-circular configuration as viewed axially of the hub, and
multiple substantially planar sprocket rings detachably mounted on said hub, each ring having a thickness less than said preselected axial thickness and an aperture extending therethrough complementary to and close fitting on said hub, each ring having sprocket teeth arrayed about its peripheral edge in the plane of and projecting radially outwardly from remainder portions of the ring which align with like teeth on an adjacent ring to form drive tang receiving gullet formations adapted to receive drive tangs on the saw chain, said rings nesting in face-to-face contiguous relationship on said hub to define a chain-receiving sprocket width substantially equal to the combined thicknesses of said rings and the contiguous teeth on said rings forming alternating chain-receiving radially-extending teeth and pockets extending fully across said chain-receiving sprocket width, and
means securing said rings on said hub.

13. The chain saw of claim 12, which further includes a power driven drive shaft and said hub is secured to said drive shaft for rotation therewith.

14. A sprocket comprising a hub having a preselected axial thickness and a non-circular configuration as viewed axially of the hub, multiple substantially planar sprocket rings mounted on said hub, each ring having a thickness less than said preselected axial thickness and an aperture defined therein complementary to and in close fitting arrangement on said hub, each of said rings having sprocket teeth formed at its peripheral edge in the plane of and projecting radially outwardly from remainder portions of the ring, with the sprocket teeth being so configured and arrayed about the periphery of each ring that when the rings are mounted on the hub the teeth on adjacent rings are aligned axially of the sprocket, and a pair of side plates detachably secured to opposite sides of said hub to secure said rings on the hub and confine a chain thereon.

15. The sprocket of claim 14, wherein said side plates extend radially outwardly past the peripheral edges of said rings.

16. A sprocket comprising a hub having a preselected axial thickness and a non-circular configuration as viewed axially of the sprocket, multiple substantially planar sprocket rings mounted on said hub, each ring having a thickness less than said preselected axial thickness and an aperture extending therethrough complementary to and close fitting on said hub, each sprocket ring having sprocket teeth arrayed about its peripheral edge in the plane of and projecting radially outwardly from remainder portions of the ring which align with like teeth on an adjacent ring to form chain-receiving teeth and pockets, and a pair of side plates detachably secured to opposite sides of said hub to retain said rings on said hub.

17. The sprocket of claim 16, wherein said side plates extend radially outwardly beyond the peripheral edges of said rings.

* * * * *